Mar. 6, 1923.
P. BASS
1,447,273
COMBINATION TRACTOR PLOW
Filed May 20, 1921 2 sheets-sheet 2
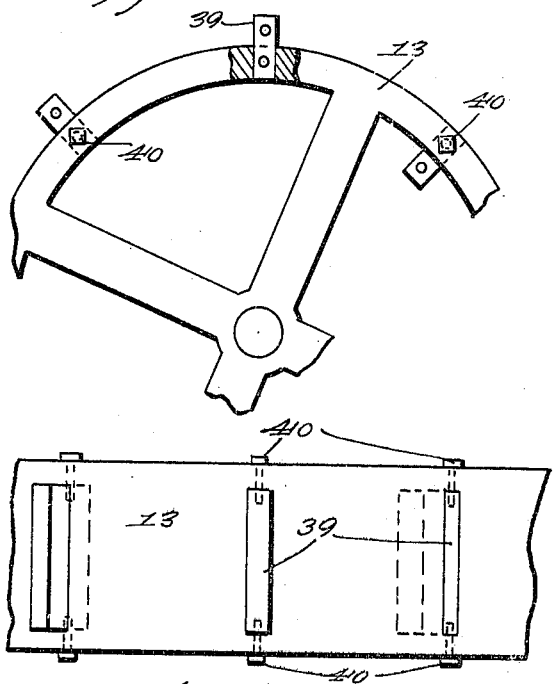
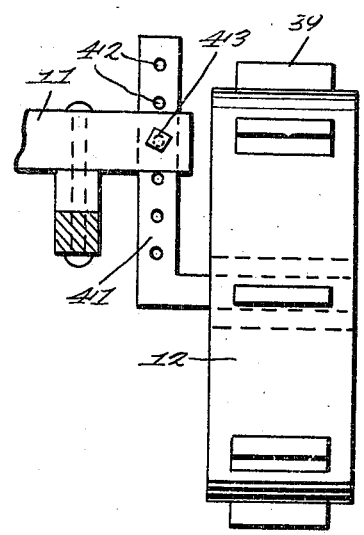
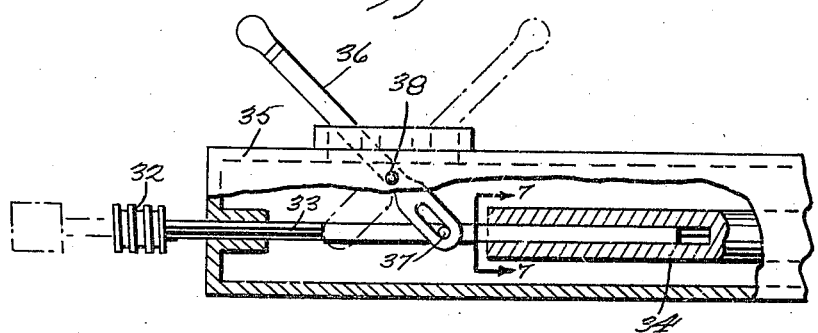
Inventor
Peter Bass.
By his Attorney
George C. Heinick Patented Mar. 6, 1923.

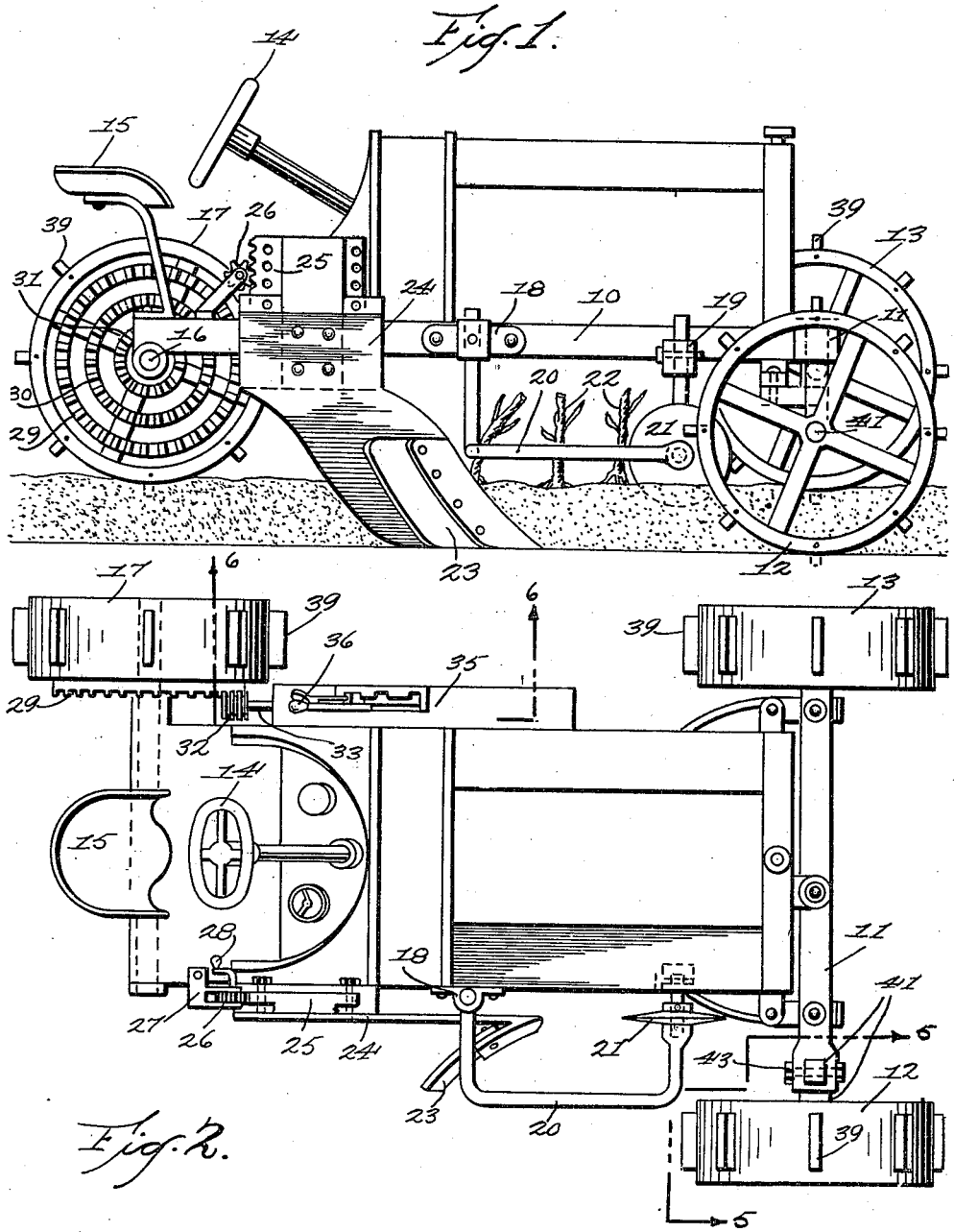

1,447,273

UNITED STATES PATENT OFFICE.

PETER BASS, OF CHICAGO, ILLINOIS.

COMBINATION TRACTOR PLOW.

Application filed May 20, 1921. Serial No. 471,160.

*To all whom it may concern:*

Be it known that I, PETER BASS, a citizen of Poland, residing at Chicago, county of Cook, and State of Illinois, have invented certain new and useful Improvements in Combination Tractor Plows, of which the following is a specification.

My invention relates to improvements in motor plows and it consists in a certain novel construction and arrangement of parts for service fully set forth hereinafter and specifically pointed out in the appended claim.

Another object of the invention is the provision of a means for vertically adjusting the plow share.

For further comprehension of the invention, and of the objects and advantages thereof, reference will be had to the accompanying drawings, forming a material part of this disclosure and in which:

Figure 1 is a side elevation of a tractor plow constructed according to the present invention.

Figure 2 is a top plan view of the same.

Figure 3 shows in fragmentary detail view part of a tractor wheel with the adjustable ridges or projections thereof.

Figure 4 is a top plan view thereof.

Figure 5 is a detail view along line 5—5 of Figure 2 of one of the front wheels and illustrates the means for adjusting the same in vertical direction.

Figure 6 is a detail side view, partly in section on line 6—6 of Figure 2 of the connection between drive wheel and motor, and Figure 7 is a section through the motor shaft on line 7—7 of Figure 6.

The frame 10 of the tractor plow carries the front axle 11 with traction wheels 12 and 13 adapted to be steered in the customary manner by means of a steering wheel 14 in front of the operator's seat 15 secured to the frame above the axle 16 for the rear wheel 17.

The plow share 23 of any desired, well known, and suitable construction is attached to the frame 10 by means of a socket 24 in which a rack bar 25 or the like is vertically displaceable by means of a rack gear 26 held in a bracket 27 and in mesh with the rack bar and adapted to be operated by means of a crank handle 28. The rack bar is locked in its adjusted position within the socket 24 by means of bolts or the like passed through both as indicated in Figure 2.

It will be clear that changes may be made in the general construction, arrangement of parts and combination of elements claimed and the minor details thereof without departing from the scope and spirit of my invention.

Having thus described my invention what I claim as new and desire to secure by Letters Patent of the United States, is:

In a motor tractor plow of the class described, in combination with a frame, a plow share, a socket for guiding said share, a rack bar vertically displaceable in said socket, a bracket on said frame, a rack gear on said bracket in mesh with said rack bar, a crank handle for operating said rack bar near the driver's seat, said socket and rack bar provided with a plurality of openings adapted to receive bolts for locking the parts in their relative adjusted positions.

In testimony whereof I have affixed my signature.

PETER BASS.